(12) United States Patent
Caron

(10) Patent No.: US 9,146,108 B2
(45) Date of Patent: Sep. 29, 2015

(54) METHOD OF ALIGNING AN AXISYMMETRIC VIBRATING SENSOR INERTIAL NAVIGATION SYSTEM AND CORRESPONDING INERTIAL NAVIGATION SYSTEM

(75) Inventor: Jean-Michel Caron, Saint-Gratien (FR)

(73) Assignee: SAGEM DEFENSE SECURITE, Paris (FR)

( * ) Notice: Subject to any disclaimer, the term of this patent is extended or adjusted under 35 U.S.C. 154(b) by 1121 days.

(21) Appl. No.: 12/376,942

(22) PCT Filed: Aug. 7, 2007

(86) PCT No.: PCT/FR2007/001349
§ 371 (c)(1),
(2), (4) Date: Feb. 9, 2009

(87) PCT Pub. No.: WO2008/023108
PCT Pub. Date: Feb. 28, 2008

(65) Prior Publication Data
US 2010/0071439 A1 Mar. 25, 2010

(30) Foreign Application Priority Data
Aug. 9, 2006 (FR) .................................. 06 07230

(51) Int. Cl.
*G01C 19/5691* (2012.01)
(52) U.S. Cl.
CPC .................. *G01C 19/5691* (2013.01)

(58) Field of Classification Search
CPC .................................................. G01C 19/5691
USPC ............................................................ 73/1.38
See application file for complete search history.

(56) References Cited

U.S. PATENT DOCUMENTS 4,712,306 A * 12/1987 Cahill et al. .................... 33/304
4,951,508 A * 8/1990 Loper et al. .................... 73/1.84

FOREIGN PATENT DOCUMENTS

EP    0 810 418 A1    12/1997
EP    1 445 580 A     8/2004

OTHER PUBLICATIONS

Hong, "Compensation of nonlinear thermal bias drift of Resonant Rate Sensor using fuzzy logic," Sensors and Actuators, vol. 78, No. 2-3, Dec. 14, 1999, pp. 143-148.

* cited by examiner

*Primary Examiner* — Laura Martin
*Assistant Examiner* — Alex Devito
(74) *Attorney, Agent, or Firm* — Muncy, Geissler, Olds & Lowe P.C.

(57) ABSTRACT

The method of aligning an inertial unit having an axially symmetrical vibrating sensor that generates vibration comprises the step of establishing the vibration in a position for which the sensor presents variation in drift error that is the smallest relative to variation in drift error for other positions of the vibration.

9 Claims, 1 Drawing Sheet

METHOD OF ALIGNING AN AXISYMMETRIC VIBRATING SENSOR INERTIAL NAVIGATION SYSTEM AND CORRESPONDING INERTIAL NAVIGATION SYSTEM

BACKGROUND OF THE INVENTION

Field of the Invention

The present invention relates to a method of aligning an inertial unit having an axially symmetrical vibrating sensor, and to a corresponding inertial unit including an axially symmetrical vibrating sensor.

BRIEF DESCRIPTION OF THE RELATED ART

In order to determine the orientation of a carrier, in particular in order to navigate an airplane, it is common practice to use an inertial unit that includes axially symmetrical vibrating sensors such as hemispherical-bell vibrating sensors or Quapasons.

It is also known that an axially symmetrical vibrating sensor is adapted to operate either in free-gyro mode or in rate-gyro mode. In free-gyro mode, the vibration is sustained but position is left free; when the orientation of the carrier varies, the position of the vibration relative to the base is representative of the angle through which the carrier has turned.

In rate-gyro mode, vibration is sustained and its position relative to its base is kept unchanging by applying suitable electronic control. The control required is then representative of the rate of rotation of the carrier in inertial space.

In practice, axially symmetrical vibrating sensors that are used for navigation in free-gyro mode benefit from a scale factor (Bryan coefficient) of excellent quality.

Navigating a journey comprises two main stages:
  a preparatory or "alignment" stage for defining the initial geographical orientation of the unit; and
  the journey proper during which the initial geographical orientation serves as a reference for calculating the instantaneous geographical orientation and the position of the carrier.

The quality of the resulting navigation, and in particular the accuracy with which heading is calculated, depends directly on the drift error of the gyroscope fitted to the navigation unit.

Axially symmetrical vibrating gyroscopes used in free-gyro mode present the feature of presenting drift error that is a function of the position of the vibration relative to the base of the sensor. This drift error is naturally modeled and compensated, but such compensation is never perfect. There thus remains drift error that is a function of position. When such gyroscopes are used in navigation units, this drift error constitutes one of the sources of error in the unit.

In addition, the drift error also varies as a function of temperature and as a function of time.

The invention is based on two observations:
  1) the drift error of gyroscopes during the alignment stage has a particularly large influence on navigation performance; and
  2) during the alignment stage, the carrier does not change its orientation.

When a navigation unit is started, the initial position of the vibration is a priori arbitrary, and it can vary from one start-up to another; the drift error associated with the position of the vibration is thus variable and can disturb the quality of the alignment.

SUMMARY OF THE INVENTION

An object of the invention is to minimize the effects of drift error on the navigation performance of the inertial unit.

In order to achieve this object, the invention provides a method of aligning an inertial unit having an axially symmetrical vibrating sensor that generates a vibration, the method including the step of establishing the vibration in a position for which the sensor presents drift error variation that is minimized relative to the drift error variations for other positions of the vibration.

This procedure makes it possible:
  to minimize alignment errors resulting from the drift error of the sensor; and
  to improve the repeatability of drift error from one alignment to another, thus making it possible to observe it and therefore to compensate it, since the position of the vibration remains the same.

In an advantageous implementation of the method of the invention, the position selected for the vibration during the alignment stage takes account essentially of variations in drift error as a function of temperature.

In another preferred implementation of the invention, the vibration position selected for the alignment stage takes account initially of variations in drift error as a function of temperature and then of variations in drift error as a function of time.

In another aspect, the invention provides a an inertial unit comprising an axially symmetrical vibrating sensor, means for exciting the sensor to generate vibration, and means for establishing vibration in a position for which the sensor presents variation in drift error that is the smallest compared with variation in drift error for other positions of the vibration.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention, and in which.

DETAILED. DESCRIPTION OF THE INVENTION

With reference to the figures, the hemispherical-bell vibrating sensor shown comprises in known manner a silica bell 1 mounted on a base 2 likewise made of silica, the bell 1 being surrounded by a sealed housing 3 enabling the sensor to be evacuated.

Figure 1:
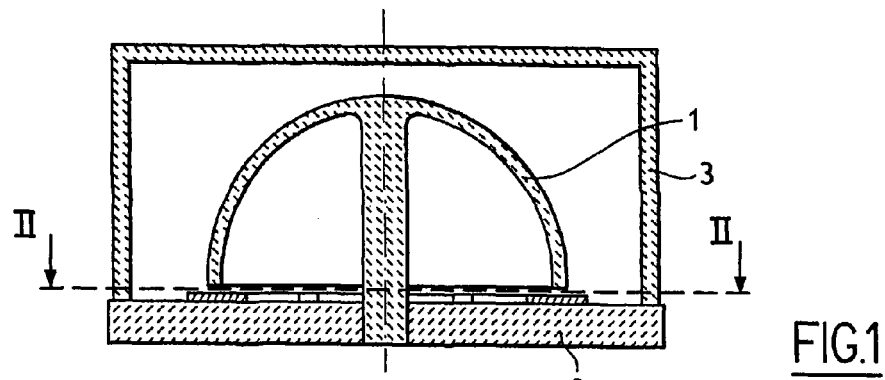
FIG. 1 is a diagrammatic axial section view on line I-I of FIG. 2 showing a hemispherical-bell vibrating sensor.
Figure 2:
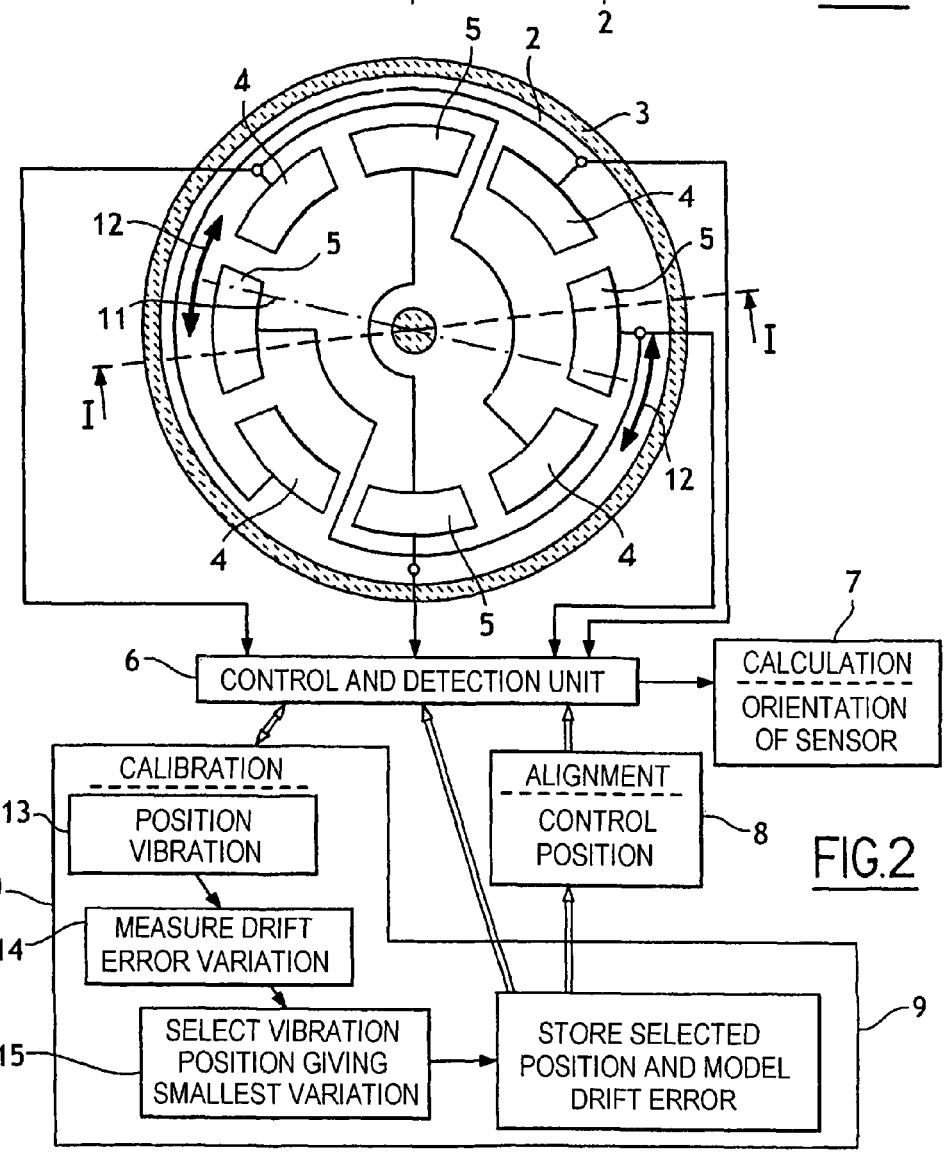
FIG. 2 is section view on line II-II of FIG. 1 together with a block diagram illustrating an implementation of the method of the invention.

Also in known manner, the inside surface of the bell 1 is metal-plated, as is its bottom edge that extends facing two pairs of control electrodes 4 and two pairs of detection electrodes 5 suitably connected to a control and detection unit 6 for generating vibration 11 represented by a chain-dotted line in FIG. 2, and of position that can be controlled by the control unit 6.

Also in known manner, the control and detection unit 6 is connected to a member 7 for calculating the orientation of the sensor on the basis of detection signals received from the control and detection unit.

According to the invention, the alignment stage is performed by exciting the sensor with a control signal that positions the resulting vibration in a selected position stored in a memory member 9.

In the example shown, the selected position for implementing the alignment stage is determined during a calibration stage 10 that is preferably performed in a workshop and comprises the following steps: with the sensor being held stationary, it is excited with a control signal 13 in a plurality of successive different vibration positions represented in FIG. 2 by a chain-dotted line 11 and by bold double-headed arrows 12. For each vibration position, a measurement 14 is performed of the variations in drift error as a function of temperature by taking the sensor successively to mutually different temperatures while keeping the vibration position control constant. The various measurements of the real positions that are obtained are stored, and then a comparison is performed between the variations in this error in order to select 15 the position that gives the smallest variations as a function of temperature.

When the variations in drift error as a function of temperature are the same in a plurality of vibration positions, then, in a preferred implementation of the invention, provision is made for performing new measurements, in each of the vibration positions, which new measurements are performed at constant temperature and at mutually different instants in order to sense variations in drift error as a function of time, and to select a position that gives the smallest variations in drift error. The position finally retained is stored in the position memory member 9 for subsequent use for each alignment stage. During each alignment stage, vibration is set up directly in the stored position.

Also preferably, the drift error, including variations therein, is modeled as a function of temperature and as a function of time, and the model is stored in the memory member 9 for transmission to the control and detection unit 6 in order to make corrections to measurements taken during the alignment stage.

Naturally, the invention is not limited to the information described, and variant implementations can be provided without going beyond the ambit of the invention as defined by the claims.

In particular, although provision is made in the preferred implementation to perform selection on a priority basis on variations in drift error, as a function of temperature, since that is generally the parameter that is the most sensitive, it is possible to make' provision for selecting position directly on the basis of variations in drift error as a function of time, or on the contrary to limit selection to a position in which the variations are the smallest as a function of temperature.

Although the invention is described more particularly with a hemispherical-bell vibrating sensor, the invention applies to any axially symmetrical vibrating sensor used in free-gyro mode, in particular a Quapason.

Although the invention is described as incorporating a prior calibration stage, it is possible for the vibration position for the alignment stage to be initially selected randomly and then to be modified after a number of journeys, thereby making it possible to perform statistical analysis on drift error for the different positions in which vibration is established during successive alignment stages, and to compare the results obtained so as to end up retaining the best position during the alignment stage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of aligning an inertial unit fitted to a carrier, the inertial unit having an axially symmetrical vibrating sensor that generates a vibration, wherein the method includes the step of exciting the sensor with a control signal that determines the position of the vibration for which the sensor presents drift error variation that is minimized relative to the drift en or variations for other positions of the vibration, and the step of defining an initial geographical orientation of the inertial unit, the method being performed while the carrier is immobile.

2. The method according to claim 1, including a calibration stage comprising the steps of exciting the sensor to control vibration in successive mutually-different positions and at mutually-different temperatures, and for each vibration position, of measuring variations in drift error as a function of temperature, and of selecting a position for which variations in drift error are the smallest.

3. The method according to claim 1, including a calibration stage comprising the step of exciting the sensor to cause vibration to take place in successive mutually-different positions at constant temperature, and for each position, of measuring variations in drift error at mutually-different instants, and of selecting a position for which the variations in drift error are the smallest.

4. The method according to claim 1, including a calibration stage comprising the steps of exciting the sensor to cause it to vibrate in successive mutually-different positions at mutually-different temperatures, of measuring, in each vibration position, variations in the drift error as a function of temperature, of selecting positions for which the variations in drift error are the smallest, in measuring, for those positions, the variations in drift error at mutually-different instants, and in selecting a position for which the variations in drift error as a function of the instants are the smallest.

5. The method according to claim 1, including a calibration stage comprising the steps of modeling the drift errors and of determining a drift error correction.

6. An inertial unit fitted to a carrier, comprising an axially symmetrical vibrating sensor, and means for exciting the sensor to generate vibration, wherein the inertial unit further comprises means for establishing vibration in a position for which the sensor presents variation in drift error that is the smallest compared with variation in drift error for other positions of the vibration, an initial geographical orientation being defined by said position when the carrier is immobile.

7. The inertial unit according to claim 6, including a memory member for storing the position in which the sensor presents drift error having the smallest variations.

8. The inertial unit according to claim 7, including memory means for storing a model of drift error and means for producing a drift error correction.

9. A method of navigating a carrier on which an inertial unit is fitted, said inertial unit having an axially symmetrical vibrating sensor that generates a vibration, wherein the method includes the step of establishing the position of the vibration for which the sensor presents drift error variation that is minimized relative to the drift error variations for other positions of the vibration, defining while the carrier is immobile an initial geographical orientation of the inertial unit from said established position of the vibration and while the carrier is mobile, using the initial geographical orientation as a reference for calculating an instantaneous geographical orientation and a position of the carrier.

\* \* \* \* \*